May 21, 1968 P. E. BONNAURE 3,384,245
CONTROL SYSTEM FOR A TRAVELLING BRIDGE OR CRANE
Filed March 7, 1966 3 Sheets-Sheet 2
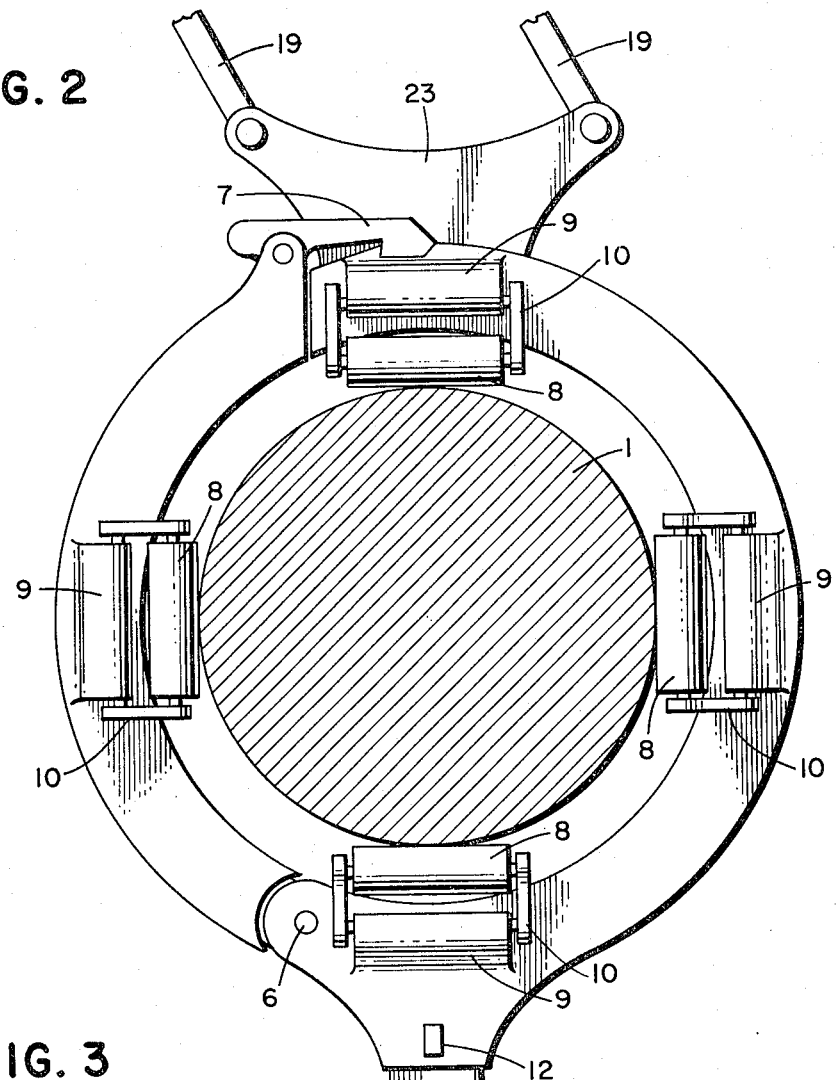
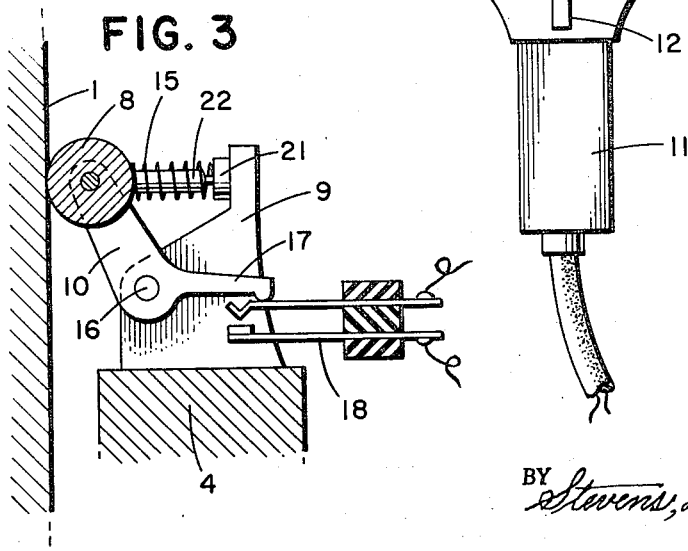
INVENTOR
Pierre E. Bonnaure
BY *Stevens, Davis, Miller & Mosher*
ATTORNEYS

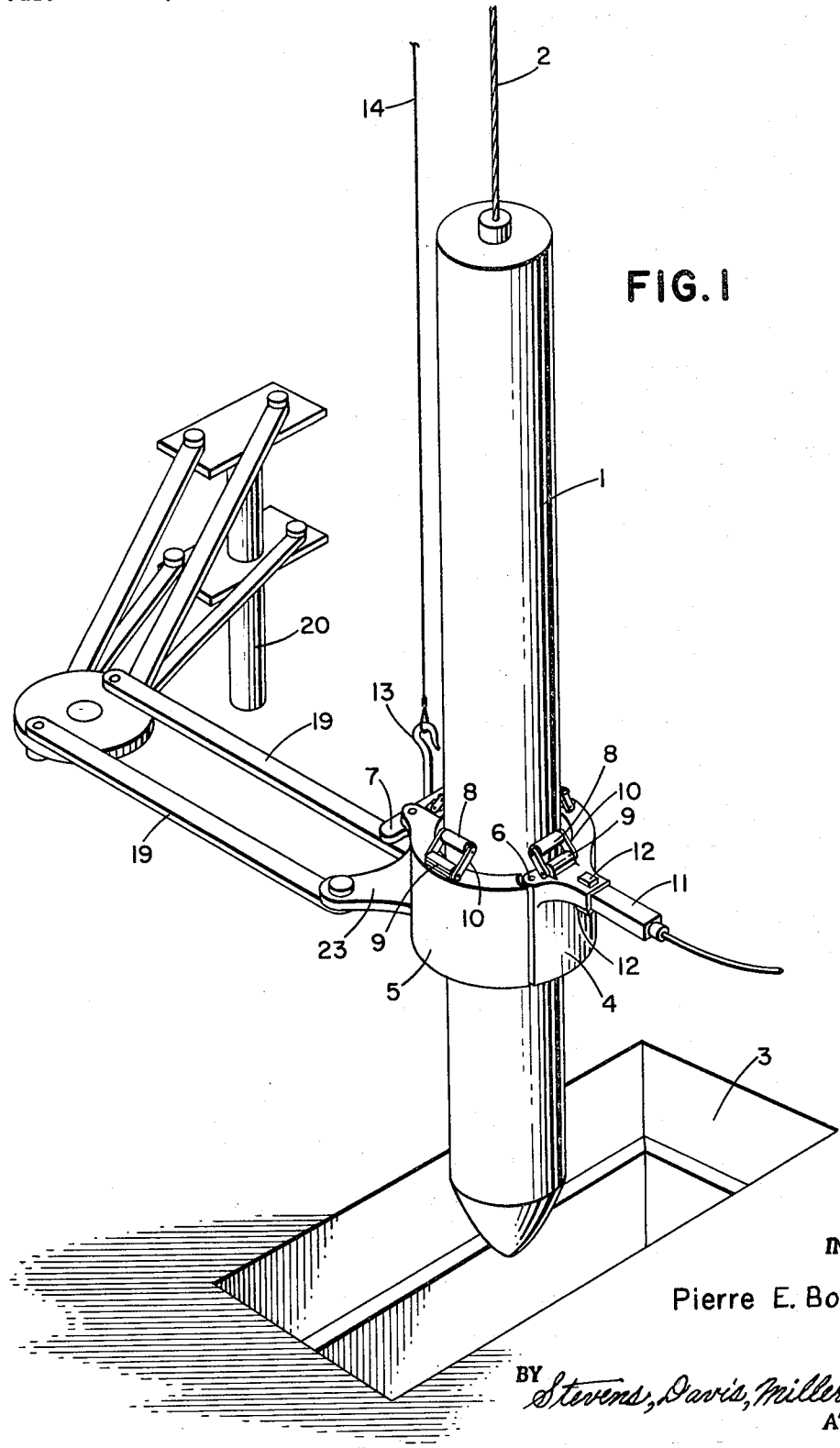

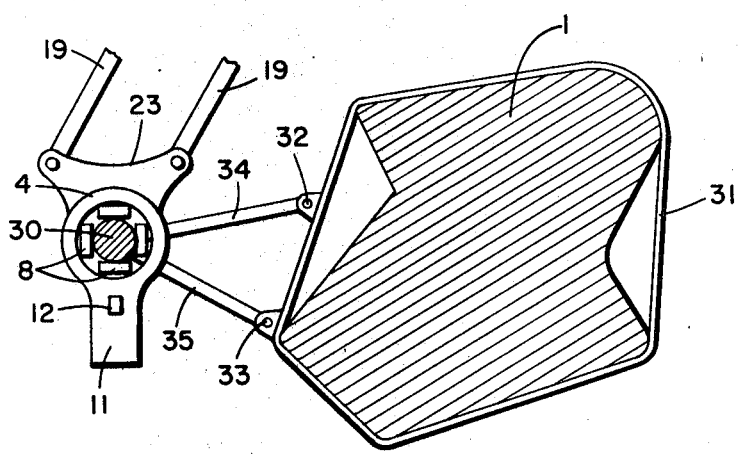

United States Patent Office 3,384,245
Patented May 21, 1968

3,384,245
CONTROL SYSTEM FOR A TRAVELLING
BRIDGE OR CRANE
Pierre E. Bonnaure, Ispra, Varese, Italy, assignor to European Atomic Energy Community (Euratom), Brussels, Belgium
Filed Mar. 7, 1966, Ser. No. 532,226
Claims priority, application Belgium, Mar. 11, 1965, 10,091; Dec. 17, 1965, 21,743
12 Claims. (Cl. 212—1)

ABSTRACT OF THE DISCLOSURE

A control system for a travelling bridge having a frame adapted to encircle the article to be moved and a plurality of inwardly directed thrust elements fixed around the frame and adapted to emit a signal in response to the reaction of the article against displacement of the frame, so that the article can be moved accordingly by external means. A grip adapted to be held by the operator is fixed externally on the frame and has a pushbutton control for the bridge's vertical movements.

This invention relates to a control system for a travelling bridge or travelling crane for conveying heavy articles, more particularly but not exclusively to a control system for the travelling bridges or cranes used in fuel element charging and/or discharging operations in a nuclear reactor.

When a travelling bridge or crane conveys heavy objects, the normal practice is for the travelling bridge to be controlled from a control station where the operator has a large number of pressbuttons controlling slow and fast speeds in both directions along three perpendicular axes. When an accurate movement or positioning of the article is required, for instance, during fuel element charging and/or discharging operations, the operator must control the movements by consecutive actions. The distance which separates him from the exact place where the charge is to be deposited, the serious results of any error and the reduced visibility available to him make it essential for him to be very careful, and he sometimes has to be guided by signs given by an assistant who stays very near the charge along the path travelled thereby.

It is an object of this invention to speed up and alleviate the operator's job making available to him a control system for a travelling bridge or crane such that the operator can control the movements of the charge or other object to be deposited simply by walking beside the same and pushing the control lightly in the required direction of movement.

To this end there is provided, according to the invention, a control system for a travelling bridge or crane comprising a frame which, in use, encircles or partly encircles the article to be moved or an upright part movable therewith, means whereby the orientation of the frame to a fixed reference direction may be kept constant, inwardly directed thrust elements on the frame responsive to the reaction of the article or part to a displacement of the frame in a direction of movement required for the article and means to convert the response of the element into a signal to cause movement of the bridge or crane in the required direction.

The aforesaid part movable with the article may be a suspension cable therefor or a vertical stud, pin, pillar or the like attached to the article.

Some specific embodiments of control system embodying the above and other features of the invention will now be described by way of example and with reference to the accompanying drawings in which:

FIGURE 1 is a perspective view of one example of the system forming the invention;

FIGURE 2 is a plan view of the frame and of the frame handle or grip shown in FIGURE 1, the view being to a larger scale than is FIGURE 1;

FIGURE 3 shows in more detail one embodiment of a thrust or pressure-sensitive element of which a general view is given in FIGURES 1 and 2; and FIGURE 4 is a plan view of an alternative arrangement.

Referring first to FIGURES 1 and 2, an article 1 which it is required to move and which can be, as in the particular case shown, a nuclear reactor fuel element, is hung on a carriage or a travelling bridge (not shown) by a cable 2 above a trap 3 through which the fuel element is introduced into the reactor core. The article 1 is introduced inside a frame or ring 4 made of light alloys or plastics, to which end one arm 5 of the frame or ring can be opened around a hinge pivoted at 6. A latch 7 holds the arm or branch 5 in the closed position. Inside the frame 4 are four Teflon rollers 8 which are pivoted to four uprights 9 of the frame by means of levers 10 on the basis of the system to be described hereinafter in greater detail with reference to FIGURE 3. The frame 4 also has a grip 11, adapted to be held either in the operator's hand or by a remote handling device, and a pushbutton 12 for controlling vertical movements of the article 1 by the bridge in both directions and possibly at two speeds. To assist the operator in carrying the frame, a hook 13 can be secured thereto at a place diametrically opposite the grip 11, in which event a cable 14 can be connected to the hook to suspend the frame on the carriage of the travelling bridge.

Horizontal movement control will now be described.
FIGURE 3 is a view, to a larger scale than is FIGURE 2, of one possible form of a pressure-sensitive thrust element of which a general view is given in FIGURES 1 and 2. Adjustable and preferably calibrated, springs 15, shown only in FIGURE 3, normally bias the Teflon rollers 8 to the position shown in FIGURE 2, i.e. inwardly of the frame for engagement by the article. The springs 15 are each secured to an abutment 21 of an upright 9. Each lever 10 has an arm 17 adapted to operate a microcontact system 18 for controlling the movements of the travelling bridge.

When the operator wishes to move the article 1, he moves the frame in the required direction. The reaction of the article 1 against this frame movement thrusts the corresponding roller or rollers 8 outwards. As a roller 8 moves, it turns the corresponding lever 10 around its pivot 16 so that the arm 17 initiates the desired movement of the travelling bridge by way of the microcontact system 18. The system, as shown in FIGURE 3, is an on-off arrangement but of course a control providing two or more speeds or even a control which is progressive in dependence upon the thrust pressure applied to the roller 8 by the article 1, is also feasible. The travelling bridge continues to move until the article ceases to apply appreciable reaction to the rollers 8. All that the operator has to do is to make sure that the grip stays parallel to a reference direction. If required, this parallelism can be achieved through the agency of a system of link parallelograms 19 secured at one end to the frame by means of a member 23 and at the other end to a fixed place 20 (see FIGURE 1). The calibration of the springs 15 depends upon the weight of the article being handled and can be adjusted, for instance, by moving the abutment 21 backwards or forwards. Undesired oscillations of the article 1 in the frame 4 can be damped by a damper system comprising pneumatic dashpots 22; preferably, one dashpot 22 is provided at an end of each roller.

The invention is not of course limited to the example just described. For instance, the number of rollers and of microcontacts need not necessarily be four, the essential feature being that adequate data about the required direction of movement should be transmitted to the travelling bridge motors. Nor need the shape of the frame 4 in plan be circular, and a polygonal frame is equally suitable since the rollers can closely encircle, or partly encircle, the article 1.

The frame can encircle either the article to be moved or the suspension cable thereof or a vertical pin or stud or the like secured to the article, more particularly in cases where the article has complicated external shapes or the same vary from one load to another or of which dimensions are very considerable. Such a system is shown in FIGURE 4. A cylindrical stud or member 30 is secured to the article 1. The dimensions of the member 30 can be very small and fixing can be of any suitable kind. One kind of fixing is shown in FIGURE 4, in the form of a simple band or tape 31 encircling the article 1. The item 31 can be clamped around the article 1, for instance, by a loop or clip or the like (not shown). Two pivots 32, 33 serve to connect the band or tape 31 to two rods 34, 35, and the stud 30 is secured to the common end of the two rods 34, 35; the stud 30 may have means (not shown) for instance, swivel means, for locking it in a vertical position and providing very rapid attachment and detachment between the stud 30 and article 1. The stud 30 acts in the same way as the article 1 or the suspension cable thereof in relation to a system comprising a frame 4, link parallelogram 19, thrust-detecting elements 8, trip 11 and pressbutton 12 as already described.

Of course, any system of securing the stud 30 to the article 1 can be used without departing from the scope of the invention, since a very large number of securing systems which meet the requirements can be devised.

I claim:

1. A control system for a travelling bridge or crane comprising a frame which, in use, encircles or partly encircles the article to be moved or an upright part movable therewith, means whereby the orientation of the frame to a fixed reference direction may be kept constant, inwardly directed thrust elements on the frame responsive to the reaction of the article or part to a displacement of the frame in a direction of movement required for the article and means to convert the response of the element into a signal to cause movement of the bridge or crane in the required direction.

2. A system as claimed in claim 1 in which there are four thrust elements equally spaced around the frame and corresponding respectively to the four directions of movement of a bridge or crane.

3. A system as claimed in claim 2 in which the thrust elements comprise rollers for contacting the article or part and spring means urging the rollers inwardly of the frame.

4. A system as claimed in claim 3 in which the strength of the spring means is adjustable to suit articles of different weights.

5. A system as claimed in claim 1 in which the thrust elements include electric contacts controlling the movements of the travelling bridge or crane and operable by rollers or other sensing devices contacting the article or part.

6. A system as claimed in claim 1 further comprising a grip secured to the frame to be held in the operator's hand and having a pushbutton control for the crane or bridge providing two directions and two sensitivities to enable the article to be moved in a direction perpendicular to the plane of the frame.

7. A system as claimed in claim 1 wherein the frame is divided approximately diametrically into two parts and further comprising a hinge provided on the frame between said parts to enable the frame to be opened to receive in it the article to be moved.

8. A system as claimed in claim 1, further comprising dampers provided on the frame and operable to prevent or reduce oscillations of the article or part therein.

9. A system as claimed in claim 8 in which the dampers are pneumatic.

10. A system as claimed in claim 1, further comprising a system of link parallelograms secured to a fixed place, to keep the frame orientation constant.

11. A system as claimed in claim 1, further comprising an auxiliary cable supporting said frame from the travelling bridge.

12. A system as set forth in claim 1, applied to the conveyance of nuclear reactor fuel elements, for instance, in reactor charging and/or discharging operations.

References Cited

UNITED STATES PATENTS

| 2,803,356 | 8/1957 | Thomas | 214—16.42 |
| 2,942,736 | 6/1960 | Landsiedel | 212—21 |

ANDRES H. NIELSEN, *Primary Examiner.*